United States Patent
Huang et al.

[11] Patent Number: 5,423,308
[45] Date of Patent: Jun. 13, 1995

[54] CAMPING STOVE

[76] Inventors: Ching-Sung Huang, No. 56, Cheng Kung Road, Kuan Tien Hsiang, Tainan Hsien, Taiwan, Prov. of China; Guo-Hau Luo, No. 225, Jia Shing Road, Chu Pei City, Hsin Chu Hsien, Taiwan, Prov. of China

[21] Appl. No.: 232,962

[22] Filed: Apr. 22, 1994

[51] Int. Cl.⁶ .............................................. F24C 3/00
[52] U.S. Cl. .................... 126/38; 126/25 R; 126/9 R
[58] Field of Search .......... 126/38, 25 R, 9 R, 37 B, 126/50

[56] References Cited

U.S. PATENT DOCUMENTS

| | | | |
|---|---|---|---|
| 2,748,690 | 6/1956 | Lipsich et al. | 126/275 E |
| 3,753,431 | 8/1973 | Koziol | 126/38 |
| 4,587,948 | 5/1986 | Haglund | 126/38 |

Primary Examiner—Larry Jones

[57] ABSTRACT

A camping stove includes a pair of bases pivotally coupled together, the bases can be opened and fixed in parallel to each other for cooking food, and the bases can be folded to a compact configuration for facilitating transportation purposes. A pair of legs are coupled to the bases for supporting the base when the bases are opened, the legs form a handle for carrying the camping stove when the bases are folded. The burning device includes a board having a number of air holes for uniformly distributing gas.

3 Claims, 5 Drawing Sheets

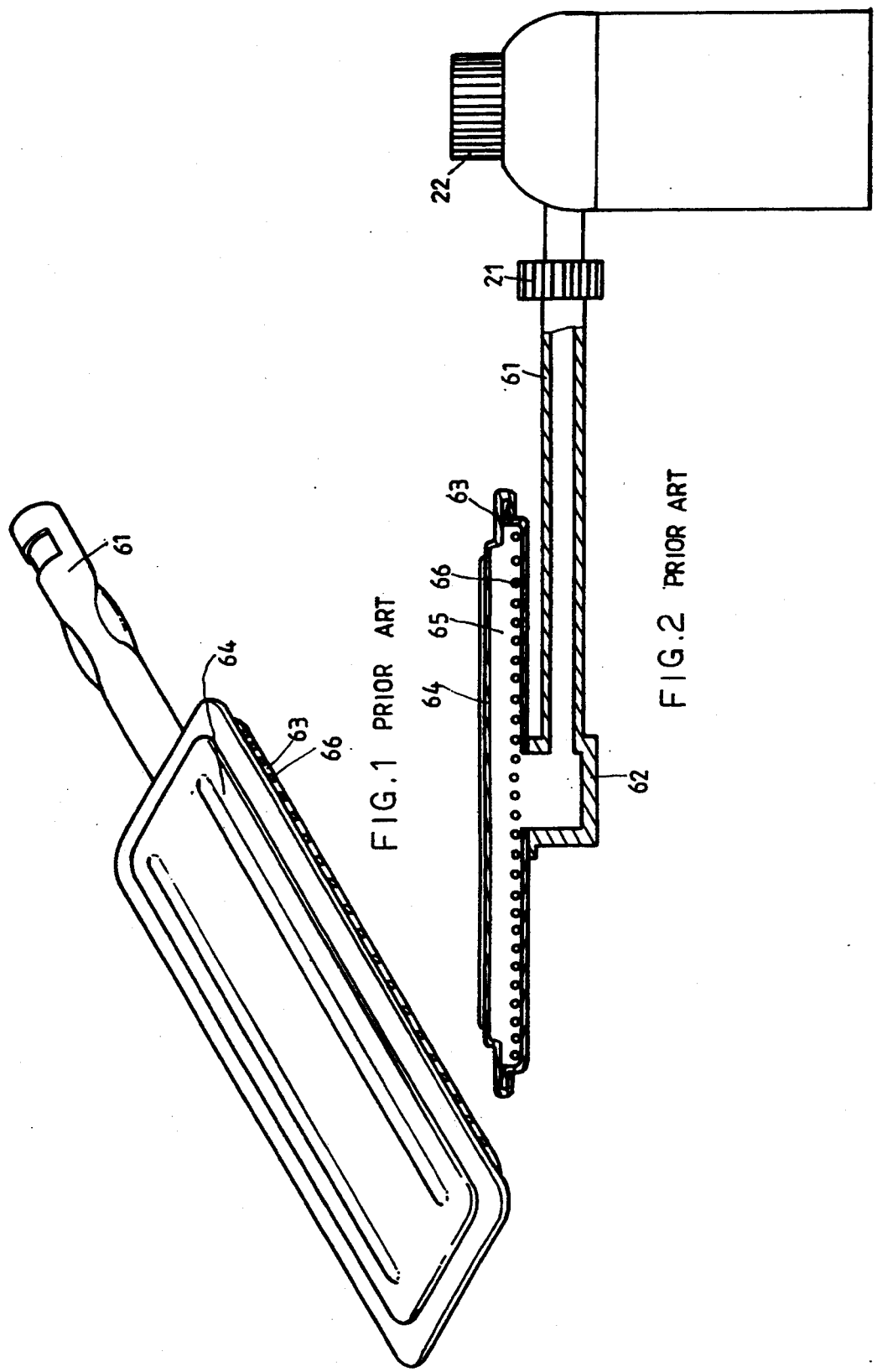

CAMPING STOVE

BACKGROUND OF THE INVENTION

1. Field of the Invention

The present invention relates to a stove, and more particularly to a portable camping stove.

2. Description of the Prior Art

A typical camping stove is shown in FIGS. 1 and 2 and comprises an inlet pipe 61 connected to a base 63 via a joint 62, a board 64 is secured on top of the base 63 so as to form a chamber 66 therebetween for receiving gas from the inlet pipe 61, a gas container 22 is connected to the inlet pipe 61 via a gas control valve 21 so as to supply gas into the chamber 66, the base 63 includes a number of holes 65 formed in the peripheral portion for allowing outward flow of the gas. However, gas flows out of the base 63 via the holes 65 in the peripheral portion only such that, in operation, heat will concentrate on the outer peripheral portion and may not uniformly apply to the cooked food. In addition, typical camping stoves occupy a large volume which is adverse for transportation purposes.

The present invention has arisen to mitigate and/or obviate the afore-described disadvantages of the conventional camping stoves.

SUMMARY OF THE INVENTION

The primary objective of the present invention is to provide a camping stove which may uniformly provide heat to the food.

In accordance with one aspect of the invention, there is provided a camping stove comprising a pair of bases pivotally coupled together, each of the bases including a bottom portion having a plurality of air holes formed therein and including two end portions, four ribs formed on the end portions of the bases, a pair of legs coupled to the bases for supporting the base, a burning device disposed in the bases, a pair of grates disposed in the bases and disposed above the burning device; and a pair of couplers each including a channel for engaging with the ribs of the bases so as to secure the bases together in parallel to each other; the bases being foldable together so as to form a compact configuration when the couplers are disengaged from the ribs.

A grip means is provided for engaging with the ribs so as to secure the bases together when the bases are folded to the compact configuration. The grip means includes two extensions for engaging and for gripping the grates.

The couplers include a second channel for engaging with the grates so as to support the grates in place. The burning device includes a board disposed in the base and having a plurality of air holes formed therein, a depression is formed in the board, a tube is engaged in the depression and includes a plurality of air holes formed therein for allowing flowing of gas, a gas container, a gas control valve connects the gas container to the tube for supplying gas into the tube, gas from the tube is uniformly distributed by the air holes of the board.

Further objectives and advantages of the present invention will become apparent from a careful reading of a detailed description provided hereinbelow, with appropriate reference to accompanying drawings.

BRIEF DESCRIPTION OF THE DRAWINGS

FIG. 1 is a perspective view of a typical camping stove;

FIG. 2 is a cross sectional view of the typical camping stove;

DETAILED DESCRIPTION OF THE PREFERRED EMBODIMENT

Figure 3:
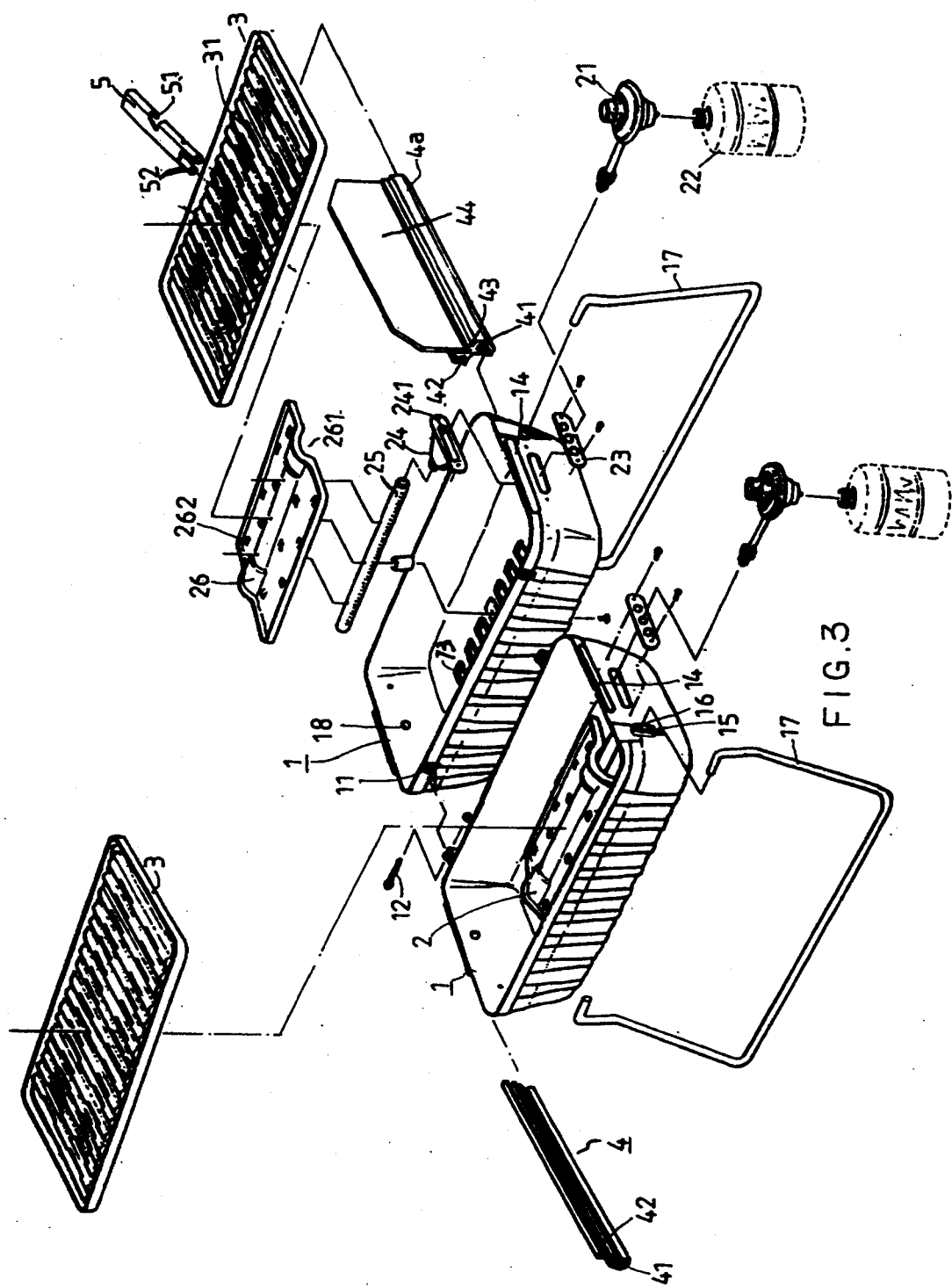
FIG. 3 is an exploded view of a camping stove in accordance with the present invention.
Figure 4:
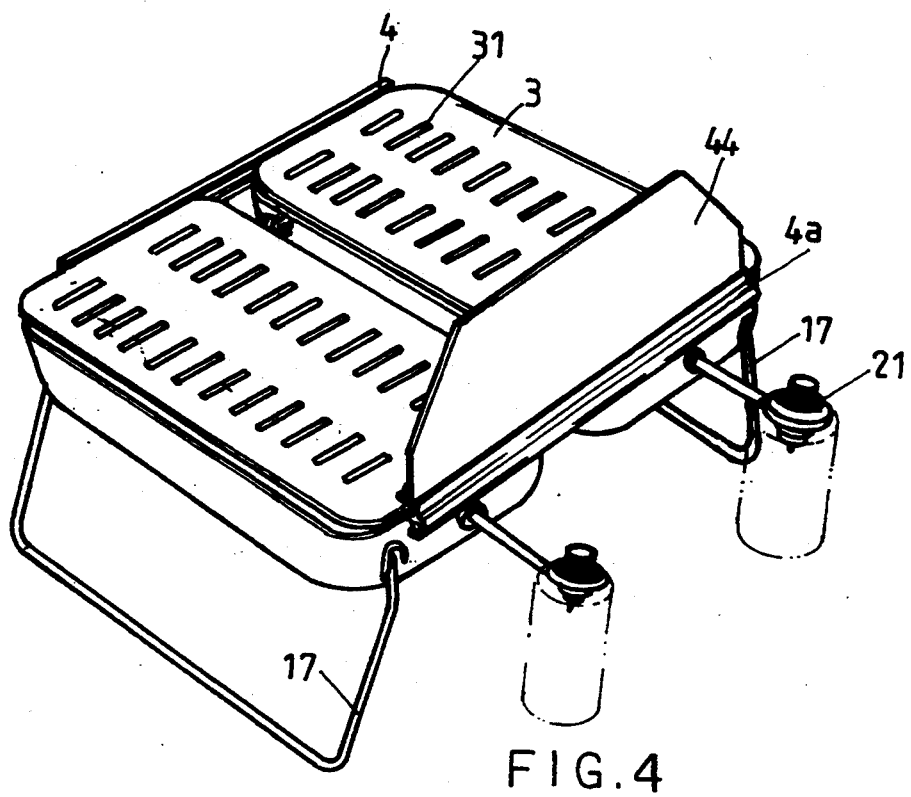
FIG. 4 is a perspective view of the camping stove which is ready for use.
Figure 5:
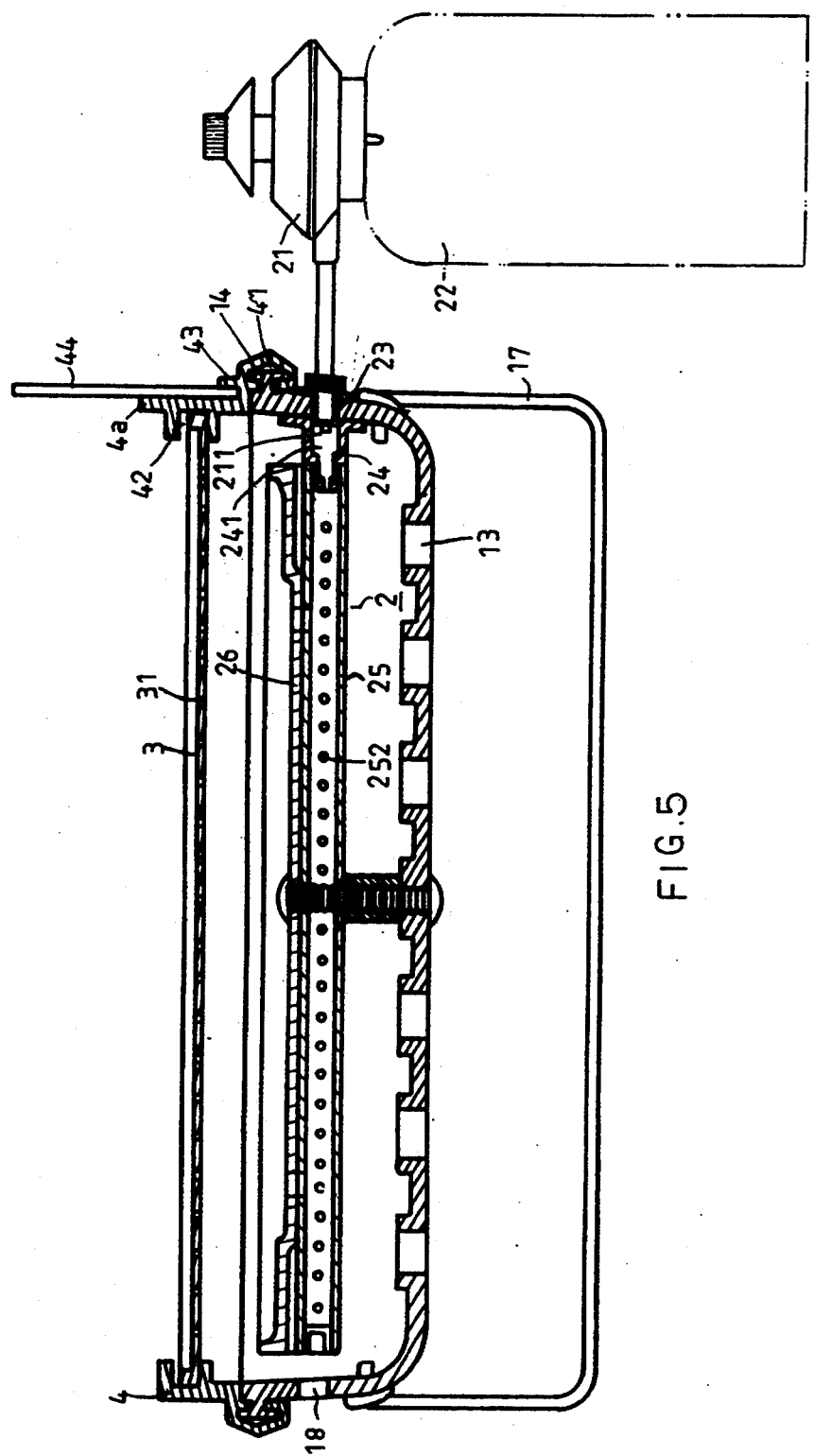
FIG. 5 is a cross sectional view of the camping stove.

Referring to the drawings, and initially to FIGS. 3 to 5, a camping stove in accordance with the present invention comprises a pair of bases 1 including ears 11 coupled together by screws 12 such that the bases 1 are rotatable relative to each other about the screws 12. A number of air holes 13 are formed in the bottom portion of each of the bases 1. A pair of legs 17 include end portions engaged in the holes 15 formed in the end portions of the bases 1, a number of caps 16 are provided for enclosing the holes 15 when the legs 17 are disengaged from the holes 15. Two apertures 18 are formed in one end portions of the bases 1 for igniting purposes. A pair of ribs 14 are formed on the end portions of each of the bases 1.

Figure 8:
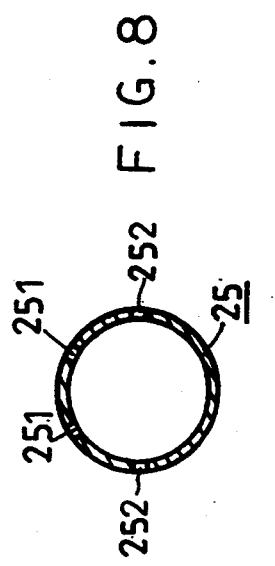
FIG. 8 is a cross sectional view illustrating the burner tube of the camping stove.

Two burning devices 2 are provided for the bases 1 respectively, each of the burning devices 2 includes a gas container 22, a gas control valve 21 secured to the gas container 22 and secured to a connector 23 which is fixed to the respective base 1, another connector 24 fixed to the base 1 and including a hollow interior 241 communicating with the gas control valve 21, a board 26 fixed in the bottom portion of each of the bases 1, a depression 261 formed in the board 26, a tube 25 received in the depression 261 and connected to the connector 24 such that gas from the container 22 may flow into the tube 25, a number of air holes 262 formed in the board 26, a number of holes 251, 252 formed in the tube 25 as shown in FIG. 8. The gas flowing into the tube 25 may be ignited by an igniting device (not shown) which may be inserted through the apertures 18 of the bases 1, the igniting device is not related to the invention and will not be described in further details.

Two grates 3 are disposed in the respective bases 1 and disposed above the boards 26, each of the grates 3 includes a number of grooves 31 formed therein, best shown in FIG. 5. Two couplers 4, 4a each includes a channel 41 formed therein for engaging with the ribs 14 of the bases 1 so as to secure the two bases 1 together in parallel to each other. The couplers 4, 4a include another channel 42 for engaging with the grates 3. One of the couplers 4a may includes a slot 43 for engaging with a panel 44. A grip device 5 includes a pair of walls 51 having two extensions 52 extended therefrom for engaging with the grooves 31 so as to grip and to move the grates 3.

Figure 6:
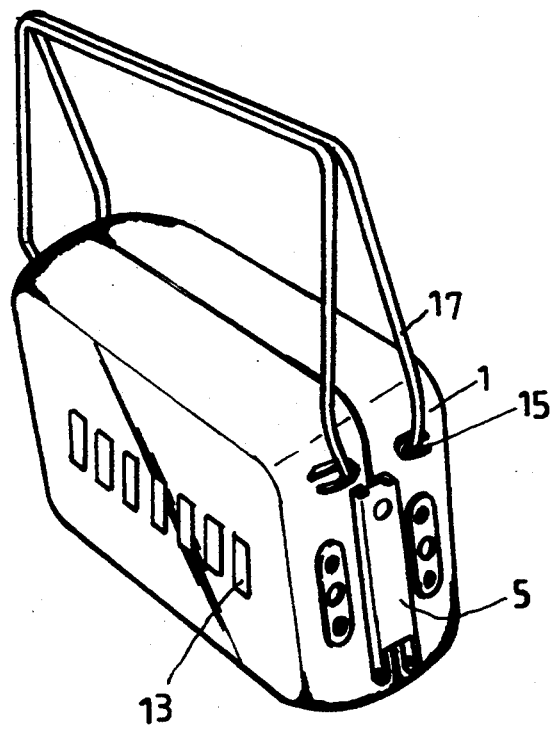
FIG. 6 is a perspective view of the camping stove which is in a folded position.
Figure 7:
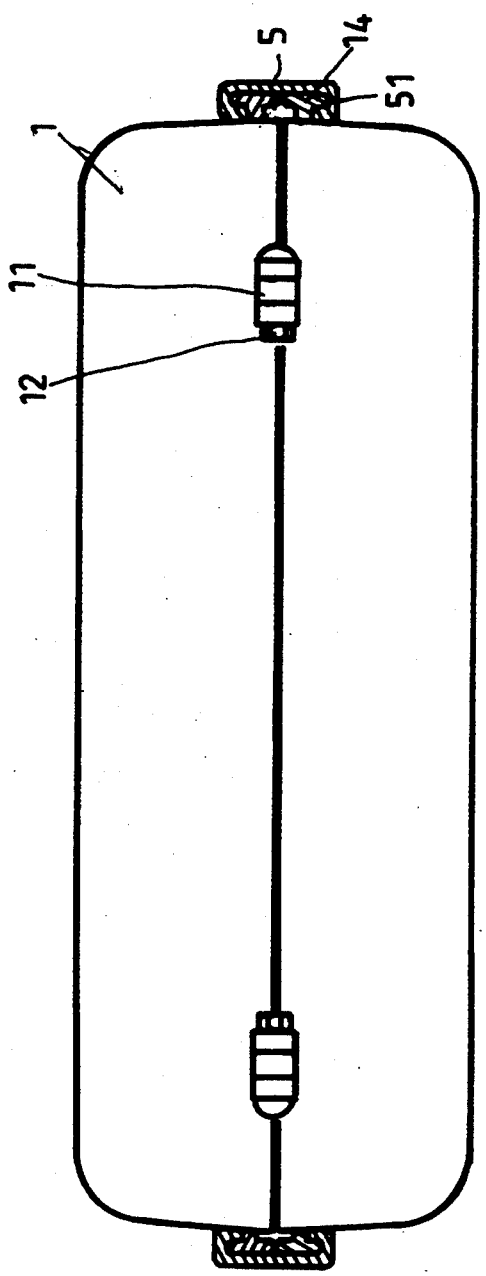
FIG. 7 is an end view of the camping stove as shown in FIG. 6.

Referring next to FIGS. 6 and 7, when the bases 1 are rotated and folded together about the screws 12, the grip devices 5 may engage with the ribs 14 of the bases 1 so as to secure the bases 1 in the closed position as shown in FIGS. 6 and 7. The legs 17 form a handle portion for carrying the camping stove.

In operation, as shown in FIGS. 3 to 5, the grooves 31 are uniformly distributed such that heat may be uniformly applied to the food to be cooked.

Accordingly, the camping stove in accordance with the present invention includes a pair of bases that can be folded to a compact configuration which is excellent for transportation purposes. In addition, heat may be uniformly distributed and applied to the food.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A camping stove comprising:
    a pair of bases pivotally coupled together, each of the bases including a bottom portion having a plurality of air holes formed therein and including two end portions, four ribs formed on said end portions of said bases;
    a pair of legs coupled to said bases for supporting said bases;
    a burning device disposed in said bases;
    a pair of grates disposed in said basis and disposed above said burning device; and
    a pair of couplers each including a channel for engaging with said ribs of said bases so as to secure said bases together in parallel to each other;
    said bases being foldable together so as to form a compact configuration when said couplers are disengaged from said ribs;
    said stove further comprising a grip means for engaging with said ribs so as to secure said bases together when said bases are folded to said compact configuration, said grip means including a forked extension adapted so as to allow a user to hold said grates.

2. A camping stove according to claim 1, wherein said couplers include a second channel for engaging with said grates so as to support said grates in place.

3. A camping stove according to claim 1, wherein said burning device includes a board disposed in said base and having a plurality of air holes formed therein, a depression is formed in said board, a tube is engaged in said depression and includes a plurality of air holes formed therein for allowing flowing of gas, a gas container, a gas control valve connects said gas container to said tube for supplying gas into said tube, gas from said tube is uniformly distributed by said air holes of said board.

* * * * *